United States Patent [19]

Peickert

[11] Patent Number: 5,324,000

[45] Date of Patent: Jun. 28, 1994

[54] NON-ROTATING NEEDLE VALVE

[75] Inventor: Wilfried R. Peickert, Madison, Wis.

[73] Assignee: BOC Health Care, Inc., Liberty Corner, N.J.

[21] Appl. No.: 19,724

[22] Filed: Feb. 19, 1993

[51] Int. Cl.$^5$ .......................... F16K 47/04; F16K 1/38
[52] U.S. Cl. ..................................... 251/122; 251/86; 251/88; 251/903
[58] Field of Search ............... 251/77, 88, 86, 122, 251/903

[56] References Cited

U.S. PATENT DOCUMENTS

| | | |
|---|---|---|
| 3,049,332 | 8/1962 | Webster .................. 251/88 |
| 3,305,207 | 2/1967 | Calderoni et al. ............ 251/86 |
| 3,761,053 | 9/1973 | Bedo et al. ................ 251/88 |
| 4,463,929 | 8/1984 | Dantlgraber et al. . |
| 4,550,726 | 11/1985 | McEwen . |
| 4,575,043 | 3/1986 | Braatz . |
| 4,601,310 | 7/1986 | Phillips . |
| 4,665,943 | 5/1987 | Medvick et al. . |
| 4,674,540 | 6/1987 | Takei et al. . |
| 4,696,320 | 9/1987 | Bull . |
| 4,723,704 | 2/1988 | Muramoto . |
| 4,728,075 | 3/1988 | Paradis . |
| 4,761,053 | 12/1988 | Cogelia et al. . |
| 4,791,956 | 12/1988 | Kominami et al. . |
| 4,821,954 | 4/1989 | Bowder . |
| 4,823,788 | 4/1989 | Smith et al. . |
| 4,823,828 | 4/1989 | McGinnis . |
| 4,830,284 | 5/1989 | Maerte . |
| 4,932,312 | 6/1990 | Sugimoto . |
| 4,932,402 | 6/1990 | Snook et al. . |
| 4,938,212 | 7/1990 | Snook et al. . |
| 4,977,927 | 12/1990 | Hill . |
| 5,000,174 | 3/1991 | Gray et al. . |

Primary Examiner—Arnold Rosenthal
Attorney, Agent, or Firm—Roger M. Rathbun; Larry R. Cassett

[57] ABSTRACT

A needle valve having improved economy of manufacture and assembly is disclosed in which the tapered end of the needle moves axially with respect to a valve seat having a cylindrical opening but does not rotate. An adjusting means, in turn, is rotated to cause the axial movement of the needle and an alignment means, preferably a sphere, is interposed between the needle and the adjusting means to provide alignment between the two components. The needle itself is also spring biased away from the valve seat.

1 Claim, 2 Drawing Sheets

NON-ROTATING NEEDLE VALVE

BACKGROUND OF THE INVENTION

This invention relates to flow control valves and, more particularly, to a needle valve having a non-rotating tapered needle that moves axially along its main axis within concentric cylindrical bores to control the flow of a fluid.

Currently, needle valves are used in a fairly wide variety of applications where precision and accuracy are required in controlling the flow of a fluid. One of such uses is in the area of medical anesthesia machines, such as is described in Braatz U.S. Pat. No. 4,226,573. In such present needle valves, the needle is a tapered member that is rotated by the user and such rotation causes the needle to move with respect to its seat by virtue of a threaded engagement of the needle within a housing. As the needle moves with respect to the seat, obviously, the flow of the fluid is controlled.

One difficulty with such needle valves, however, is in achieving precise concentricity of the needle with respect to its seat which is a torroidal (donut shaped) opening through which the fluid passes. Since conventional needles rotate as they are moved axially with respect to their seats, if the needle is out of round, a slight turn could cause flow to change in an unpredictable manner and an intended decrease of flow could actually turn out to increase the flow through the valve.

The out of round could be created by a needle that is slightly bent or, alternately, by some minute misalignment between the longitudinal axis of the threaded engagement between the valve housing and the needle and/or the longitudinal axis of the cylindrical seat. In any case, the out of round difficulty raises problems with accurate control of the fluid. Correction of the problem can require considerable expense in precise machining, inspection and correction of misalignments during the manufacturing process.

One solution to the problem was suggested in Braatz U.S. Pat. No. 4,575,043 where the needle was deliberately bent so that it physically touched the valve seat at all times in the control of the flow. As such, the profile of the passage through which the fluid passes remains the same, however, the Braatz needle valve utilized a long flexible needle and contact with internal surface of the valve seat was a rather light contact. In the needle valves of the type herein concerned, however, the needles are more rigid and a continual wiping of the internal surface of the valve seat over time can cause wear of the seat and enlarge the opening. Accordingly, for the same setting of the needle, the amount of flow through the present type of needle valve could increase with time.

The problem is, therefore, that the manufacture of a needle to near perfect concentricity is costly and very difficult. Most needles, even after the most careful manufacture, require individual quality testing and an additional special straightening operation. No matter how careful the manufacturing process, therefore, most of the needles need straightening.

Also, as discussed, the current needle valves have spindles affixed to the needle itself and which are threadedly engaged within a needle housing. The spindle also must be perfectly straight and its alignment with the center line of the valve seat and housing extremely precise or the needle is affected and again can be off center and suffer from the aforementioned problems.

SUMMARY OF THE INVENTION

The needle valve of the present invention overcomes the aforedescribed difficulties by providing a valve wherein the needle itself does not rotate as it moves axially with respect to the valve seat to control the flow of the fluid. Instead, the tapered needle moves within the cylindrical seat only axially along its longitudinal axis. The needle itself is moved by a second component, an adjustment screw that is threadedly engaged to the valve housing and which is rotated to advance or retract the needle with respect to its seat. A self centering means, in the preferred form of a sphere, is interposed between the adjustment screw and the needle such that alignment of the adjustment screw and needle is readily accomplished without expensive and time consuming procedures.

Further a spring biasing means biases the needle toward the retracted position, that is, the needle is biased to move away from its valve seat. The needle is physically aligned with respect to its seat by an internal guide that restrains the needle at a location near the distal end of the needle, that is adjacent or near to the valve seat. A further guide contains the proximal end of the needle so that the needle is well supported within the valve housing for precise movement with respect to its valve seat.

Thus, the problems associated with nonconcentric needles is alleviated since the needle itself does not rotate as it moves with respect to its seat and therefore once aligned in its internal guides, its movement remains true within the valve housing and thus with respect to the valve seat. Additionally, misalignment of the adjustment screw is also compensated by having a self centering means, such as a sphere, that is interposed between the adjustment screw and the needle.

The foregoing and other advantages and features of the present invention will become readily apparent from the following description.

BRIEF DESCRIPTION OF THE DRAWINGS

The invention is diagrammatically illustrated by way of example in the drawings appended hereto, in which.

DESCRIPTION OF THE PREFERRED EMBODIMENT

Figure 1:
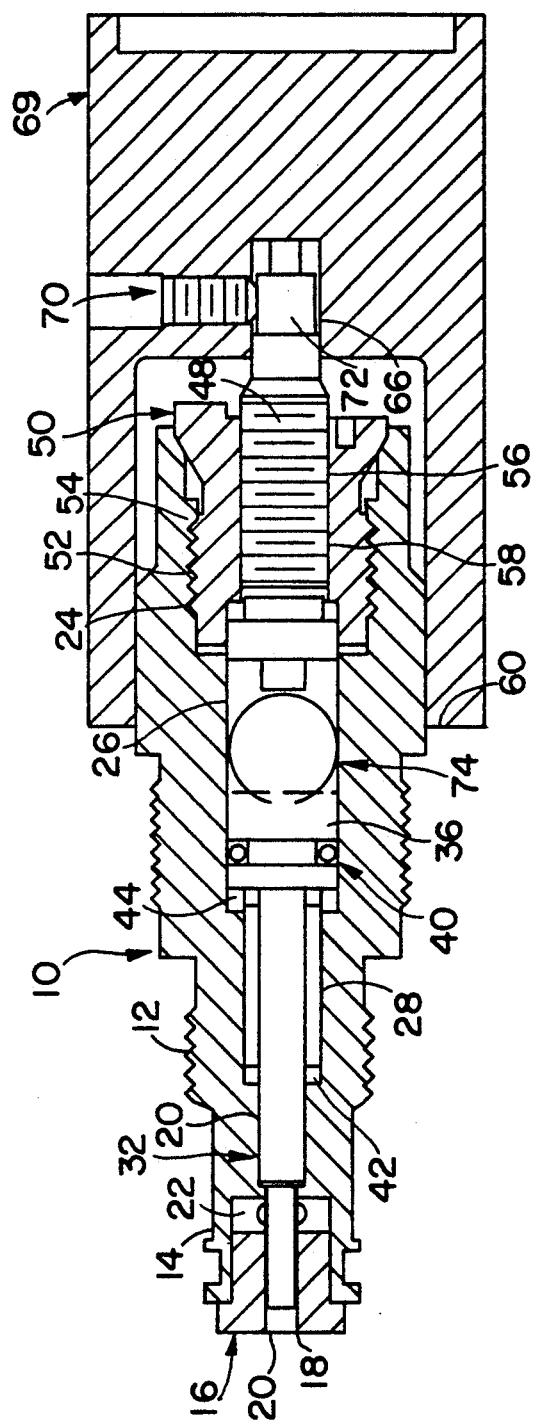
FIG. 1 is a cross sectional view of a needle valve constructed in accordance with the present invention.

In FIG. 1, there is shown a cross-sectional view of a needle valve constructed in accordance with the present invention and which includes a valve housing 10 constructed preferably of a bronze alloy material. External threads 12 are formed on the exterior of the valve housing 10 and are used to affix the valve housing to a valve block having the appropriate passageways (not shown) to conduct the fluid to and from the needle valve. As used herein, the end of the needle valve that is to be affixed to the valve block will be referred to as the distal end and the opposite end referred to as the proximal end and such designations shall apply to all components to be described herein.

At the distal end of the valve housing 10, there is formed a valve seat bore 14 and into which is press fitted a valve seat 16. Valve seat 16 is preferably formed of a fluorocarbon polymer material such as available under the trade name Kel-F and has a cylindrical opening 18 therethrough. With the valve seat 16 in position as shown in FIG. 1, an inlet 20 is formed at the distal end of the valve seat 16 and an outlet 22 comprises an opening in the valve housing 10 (partially obscured in FIG. 1). A flow path for the fluid being controlled is thus present between the inlet 20 and outlet 22 passing through the valve seat 16.

Figure 2:
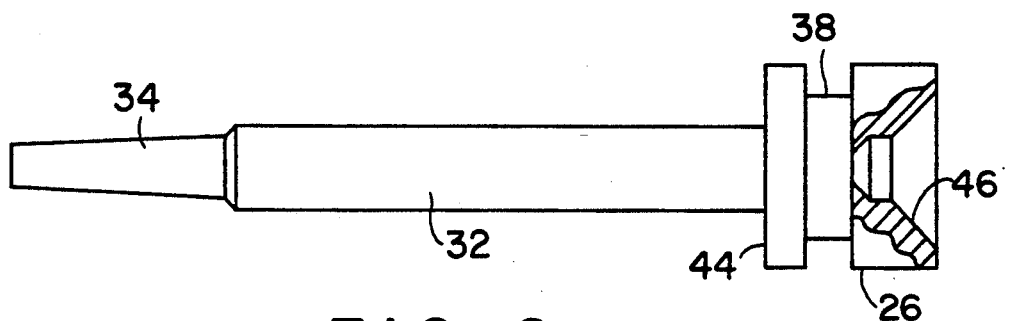
FIG. 2 is an enlarged side view of a needle used with the present invention.

Valve housing 10 has various bores, the purpose of which will be explained. At the proximal end of valve housing 10, there is an outer bore 24 and enters into an intermediate bore 26 having a lesser diameter and thus into an inner bore 28 which has a still lesser diameter. At the distal end of the inner bore 28 there is a machined needle guide 30 which is a close tolerance cylindrical bore in the valve housing 10. A needle 32 is provided within the valve housing 10 and can be described with reference to both FIG. 1 and FIG. 2 which is an enlarged side view of the needle 32.

The distal end of the needle 32 has a tapered portion 34 of a predetermined length and is tapered at a specific angle and within certain tolerances. As shown in FIG. 1, the tapered portion 34 enters the cylindrical opening 18 in valve seat 16 and acts in conjunction with valve seat 16 to control the flow of fluid passing between inlet 20 and outlet 22. As can be seen, as the tapered portion 34 is withdrawn or retracted from valve seat 16, the taper creates a larger torroidal opening through cylindrical opening 18 and thus increases the flow of fluid passing through the flow path between inlet 20 and outlet 22. Conversely, as tapered portion 34 moves into the valve seat 16, the flow of that fluid is reduced.

Needle 32 is supported through a close tolerance fitting within needle guide 30 and which insures that the centerline A of the needle 32 is concentric with the centerline of the longitudinal axis of the cylindrical opening 18 in valve seat 16. As will be seen, the needle 32 is thus supported by needle guide 30 at a point relatively close to its distal end.

At the proximal end of the needle 32 there is an enlarged cylindrical head 36 that fits within intermediate bore 26 of valve housing 10. Cylindrical head 36 freely moves within intermediate bore 26 and is sealed therein by means such as groove 38 and O-ring 40. A spring biasing means is provided to bias the needle 32 towards its retracted position with respect to valve seat 16 or away from the valve seat 16 and such biasing means may be a compression spring 42 that is seated within the distal end of inner bore 28 and the distal surface 44 of cylindrical head 36

A countersink 46 is formed at the proximal end of needle 32 and its preferable geometry is that of a frustro-conical depression, the purpose of which will be later explained.

Figure 3:
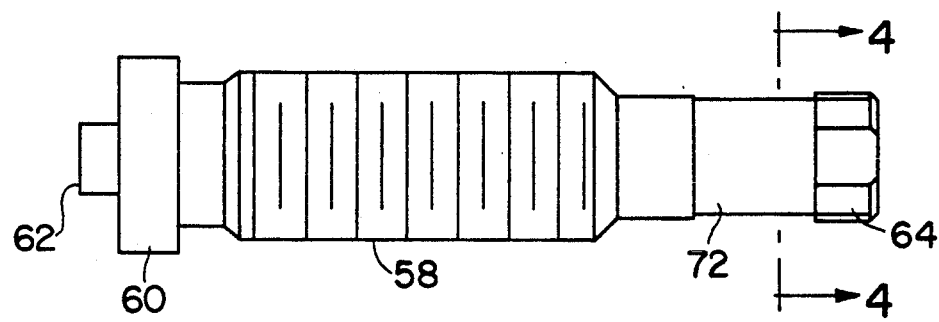
FIG. 3 is an enlarged side view of an adjustment screw used with the present invention.

An adjusting means is provided in order to cause the axial movement of the needle 32 and in its preferred form, the adjusting means is an adjustment screw 48. Adjustment screw 48 is shown in FIG. 1 and in more detail in FIG. 3 where the adjustment screw 48 is shown in an enlarged side view. Adjustment screw 48 is held within outer bore 24 of valve housing 10 by means of a cap 50 which is secured within outer bore 24 by external threads 52 on cap 50 and which mate with internal threads 54 formed in the internal surface of outer bore 24 and against matching tapers on proximal end of outer bore 24 and cap 50.

Cap 50 also has internal threads 56 which interfit with corresponding external threads 58 of adjustment screw 48 such that adjustment screw 48 may be rotated to move it axially with respect to the cap 50 and, therefore with respect to valve housing 10. The threaded engagement between the adjustment screw 48 and cap 50 may have a pitch which assures the desired flow range for a determined number of rotations of adjustment screw 48.

At the distal end of adjustment screw 48, a head 60 is formed having an external diameter sized to fit within intermediate bore 26 and to be guided therein. Projecting distally from head 60 is a cylindrical projection 62.

Figure 4:
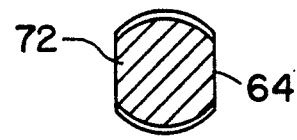
FIG. 4 is an end cross sectional view of the adjustment screw taken along the line 4—4 of FIG. 3.

At the proximal end of adjustment screw 48, there are two opposing wrench flats 64 (FIG. 4) formed on it cylindrical end that is fitted within an opening 66 in a knob 68. Knob 68 is otherwise secured to adjusting screw 48 by means such as a set screw 70 that is tightened against a reduced diameter portion 72 of the adjustment screw 48. Accordingly, as can be seen by simply rotating knob 68, the user can rotate adjustment screw 48 to cause axial movement of adjustment screw 48 within valve housing 10.

Interposed between cylindrical projection 62 of adjustment screw 48 and cylindrical head 36 of needle 32 is an alignment means and in the preferred embodiment, that alignment means is a sphere 74. The sphere 74 may be stainless steel and can be a standard ball bearing ball since various sizes are readily available having precise dimensions and tolerances.

The sphere 74 is preferred as an alignment means for various reasons. Due to the close tolerance between the internal diameter of the intermediate bore 26 within which sphere 74 moves, the movement of the sphere 74 is precisely along the longitudinal axis of intermediate bore 26. Also, the contact between the sphere 74 and adjustment screw 48 is essentially a point contact since it takes place between the flat end of cylindrical projection 62 and the curved surface of sphere 74. Thus, misalignment between the sphere 74 and the adjustment screw 48 is compensated and the sphere 74 movement will be true even if the adjustment screw 48 is off alignment due to inaccurate machining in the thread alignment or inaccuracies of the adjustment screw 48 itself. Also, the drag factor is minimized which is caused by friction between sphere 74 and adjustment screw 48 during flow adjustment.

Countersink 46 of needle 32 self aligns on sphere 74. As explained, the countersink 46 is preferably formed as a frustro-conical configuration and the sphere 74 is selected to be of a sufficient diameter that it fits within countersink 46 in a circular line contact, thereby assuring alignment between the proximal end of needle 32 and bore 26 of housing 10.

Accordingly, as may now be seen, the needle valve is operated by the user rotating the knob 68 which, in turn, rotates the adjustment screw 48 causing it to move sphere 74 axially toward and away from valve seat 16. As sphere 74 moves axially, needle 32 is also caused to move axially with respect to the valve seat 16 to control the flow of fluid passing between the inlet 20 and outlet 22. The spring bias exerted via compression spring 42 serves to push needle away from valve seat 16 and towards the sphere 74, thus insuring that good contact is maintained between the needle 32 and sphere 74.

Needle 32 thus does not rotate within valve housing 10 but moves only axially and is well supported for accurate alignment by its fitting within needle guide 30 located near the distal end of needle 32 and cylindrical head 36 guided in its movement within intermediate bore 26 within valve housing 10 and thus supporting the proximal end of needle 32.

Alignment of needle 32 with respect to valve seat 16 is therefore assured and yet the overall needle valve of the present invention is relatively easy to manufacture and assemble without the attendant problems heretofore associated with conventional needle valves.

While the present invention has been set forth in terms of a specific embodiment, it will be understood that the needle valve herein disclosed may be modified or altered by those skilled in the art to other configurations. Accordingly, the invention is to be broadly construed and limited only by the scope and spirit of the claims appended hereto.

I claim:

1. A needle valve for control of the flow of a gas, said needle valve comprising a valve housing, said valve housing having an inlet and an outlet and defining a flow path for the flow of gas between said inlet and said outlet, a valve seat in said flow path, a needle having a distal tapered end and a proximal end, said proximal end having a countersink formed as a frustro-conical indentation, said distal end positioned within said valve seat and movable toward and away from said seat to decrease and increase, respectively, the flow of gas through said seat passing from said inlet to said outlet, bias means adapted to bias said needle away from said valve seat, an adjusting means threadedly engaged within said valve housing, said adjusting means being rotatable with respect to said housing to move said adjusting means laterally within said valve housing with respect to said valve seat, and a sphere positioned between the proximal end of said needle and said adjusting means, said adjusting means contacting said sphere in a point contact and said sphere contacting said frustoconical countersink of said proximal end of said needle at a circular line contact aligning said adjusting means and said proximal end of said needle and allowing the lateral movement of said adjusting means, but not the rotational movement, to laterally move said needle with respect to said valve seat to control the flow of the fluid passing therethrough.

* * * * *